C. DUNHAM.
Potato-Digger.
No. 28,356            Patented May 22, 1860.
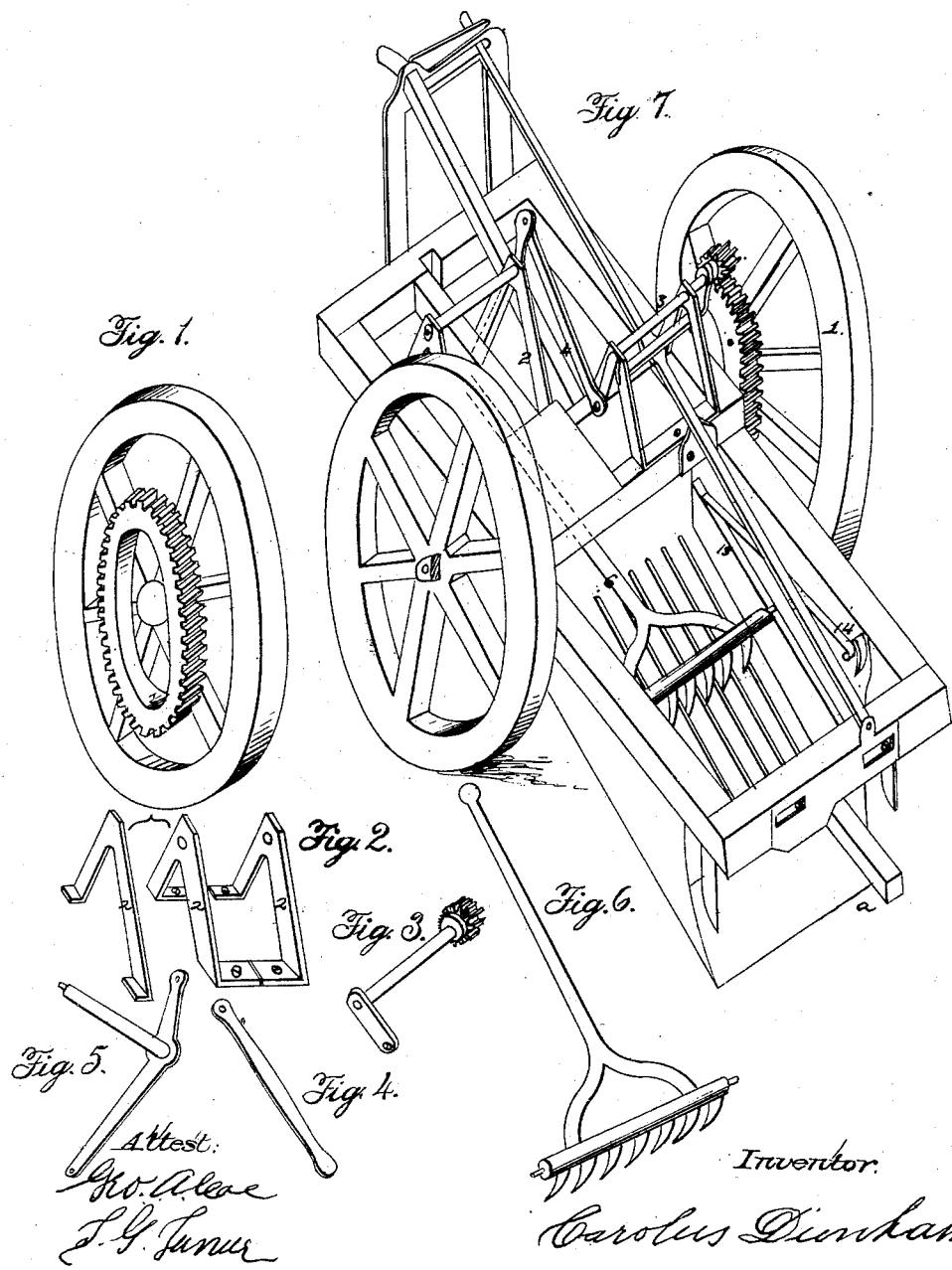

UNITED STATES PATENT OFFICE.

CAROLUS DUNHAM, OF BATAVIA, MICHIGAN.

IMPROVEMENT IN POTATO-DIGGERS.

Specification forming part of Letters Patent No. 28,356, dated May 22, 1860.

*To all whom it may concern:*

Be it known that I, CAROLUS DUNHAM, of Batavia, in the county of Branch and State of Michigan, have invented a new, improved, and useful Machine for Digging and Cleansing from the Earth Potatoes and Similar Vegetables; and I do hereby declare that the following is a full and exact description.

The nature of my invention consists in so constructing the machine by the combination of cog-wheels, cranks, springs, planes, inclined planes, and levers attached to a two-wheel vehicle with a shoe or shovel-blade plow and common rake as to raise the potatoes or other circular vegetables, or globe-shaped vegetable, upon an apron with slats or rods attached, and by the motion of the rake to clear the vegetables from the earth, leaving them on the surface.

To enable others skilled in the art to make and use my invention or improvement, I will proceed to describe its construction and operation.

I construct a two-wheel vehicle in any of the known forms with cog-wheel of less dimensions or diameter than the main wheels, and securely fastened to one of the main wheels, as indicated in the accompanying drawings, a frame of sufficient length, width, and strength to sustain the plowing apparatus and its appendages.

The plowing apparatus or shoe is of metal, shaped similar to the blade of a barn-shovel, slightly concave and circular on the front edge and with closed sides, (marked A in the drawings,) may be in any of the known forms, with metal rods attached at the rear end of the plow far enough apart to allow the earth to sift through and still retain on them the potatoes or other vegetables; also, a small cog-wheel and crank, No. 3, set in a frame, No. 2, as indicated in the drawings, its motive power obtained by meshing into cog-wheel No. 1. To crank 3 and common rake 6 is attached levers 4 5, as indicated in Fig. 7 of drawings. The lever 4 is fastened to the vehicle in or near the center and ends to lever 3 and rake 6.

The movement of the head of the hand-rake 6 is governed by a plane and inclined plane fastened to the side pieces of the plowing apparatus. The backward motion of the hand-rake 6 is governed by the plane. At the limit of such backward movement the ends of the head of the rake pass under a spring forming the rear end of the inclined plane. The rake 6 in its forward movement is to pass over the spring and thence up the inclined plane, and the machine to be constructed so as to permit this movement or the limit of the forward movement of the rake 6. The head thereof drops or falls to a level of the plane, producing a motion similar to that of the hand-rake when in use.

Figure 1 is an outline of one of the wheels of the vehicle with cog-wheel attached. Fig. 2 are standards or frame; Fig. 3, small cog-wheel combined with crank; Figs. 4 and 5, levers; Fig. 6, rake; Fig. 7, side view of machine.

I do not claim as my invention any of the separate parts of said machine or the powers employed, or the principles upon which it is made to operate, as they have all been before known and used.

What I claim as my invention, and for which I desire Letters Patent, is—

The rake 6, operated as described, the plane 13, spring, inclined plane 14, in combination with the plow and plow-box having closed sides and an open bottom, substantially as described, and for the purpose set forth above.

CAROLUS DUNHAM.

Attest:
GEO. A. COE,
JOHN ROOT.